Oct. 11, 1932.  C. S. BRAGG ET AL  1,882,543
POWER ACTUATOR FOR BRAKE MECHANISM FOR AUTOMOTIVE VEHICLES
Original Filed March 5, 1925  4 Sheets-Sheet 2
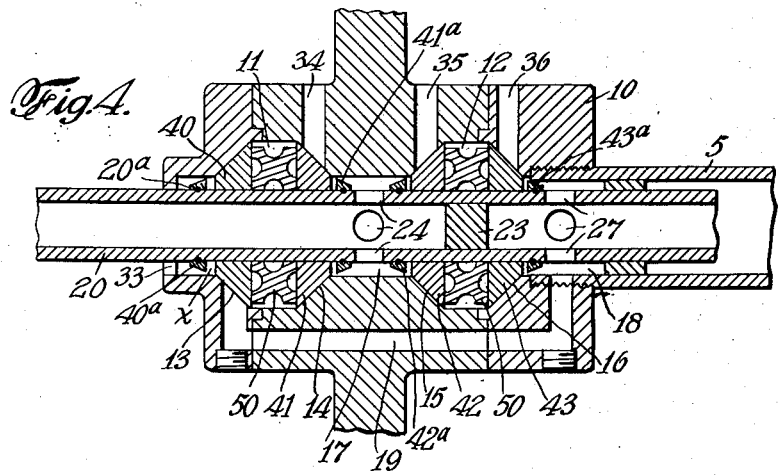
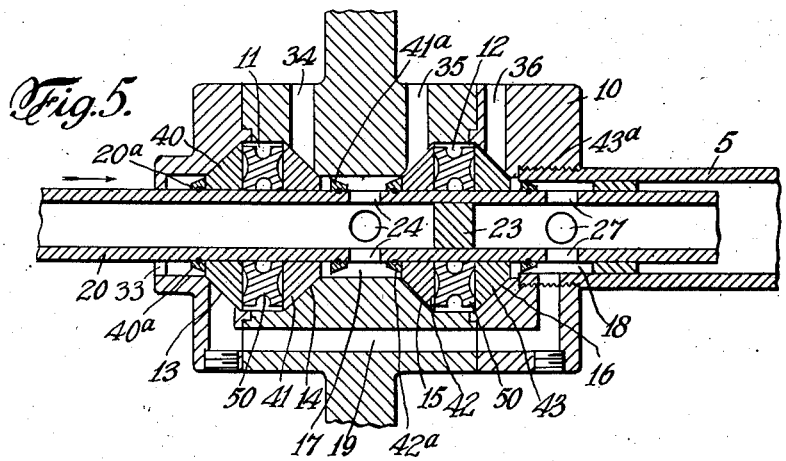
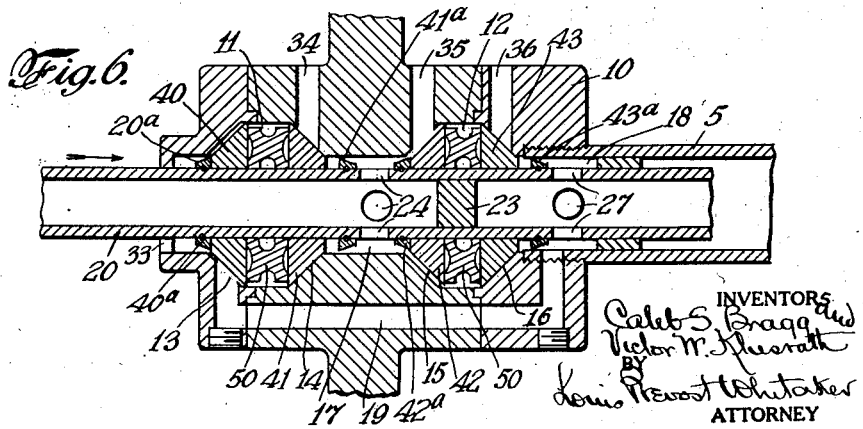

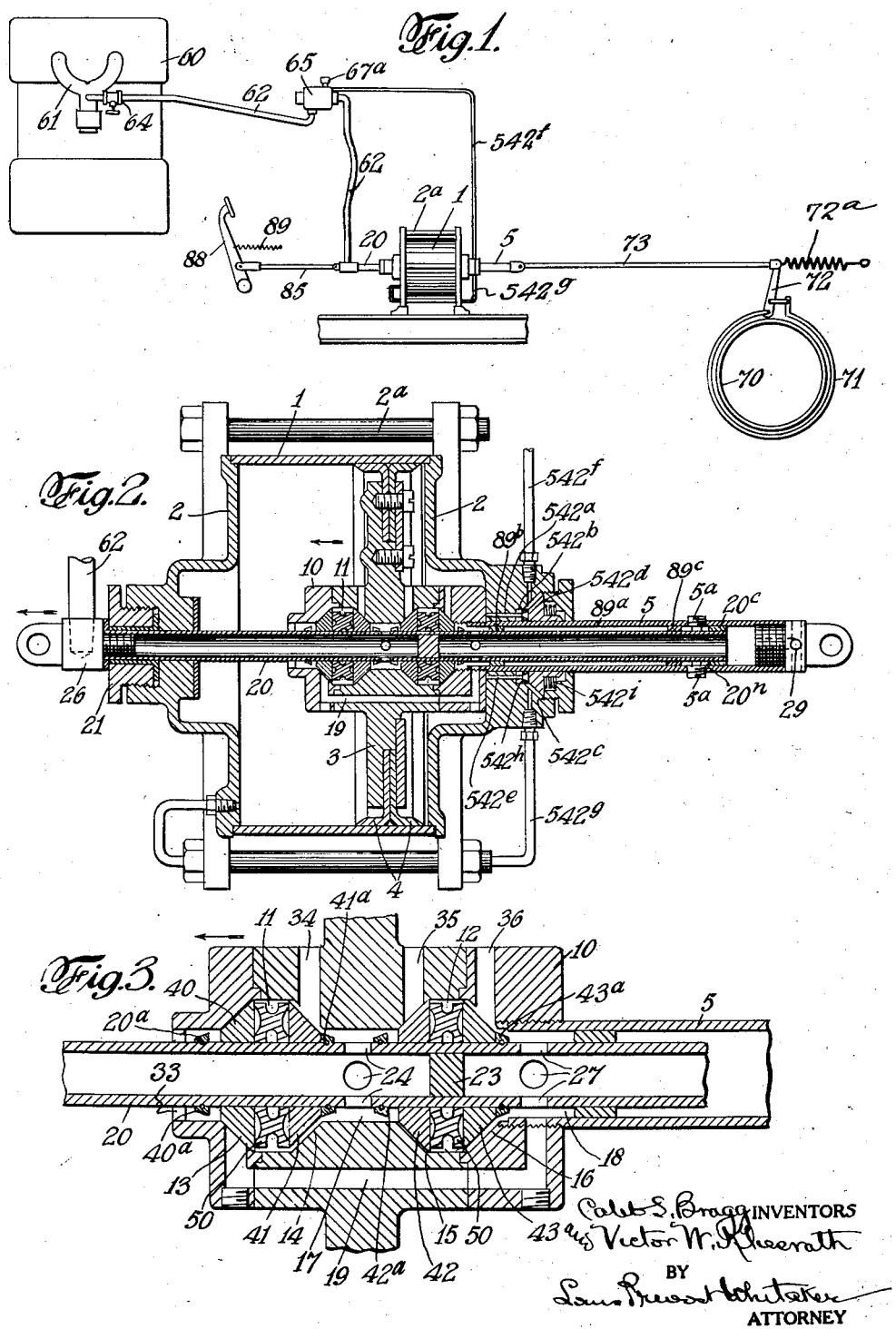

Oct. 11, 1932.  C. S. BRAGG ET AL  1,882,543
POWER ACTUATOR FOR BRAKE MECHANISM FOR AUTOMOTIVE VEHICLES
Original Filed March 5, 1925   4 Sheets-Sheet 3
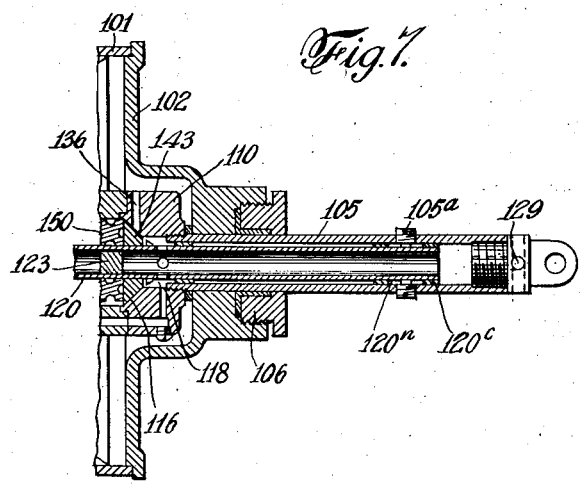
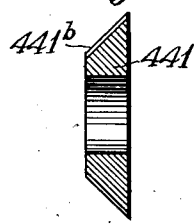
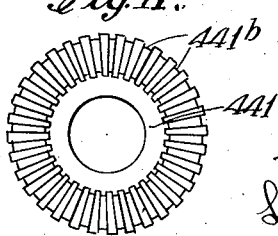

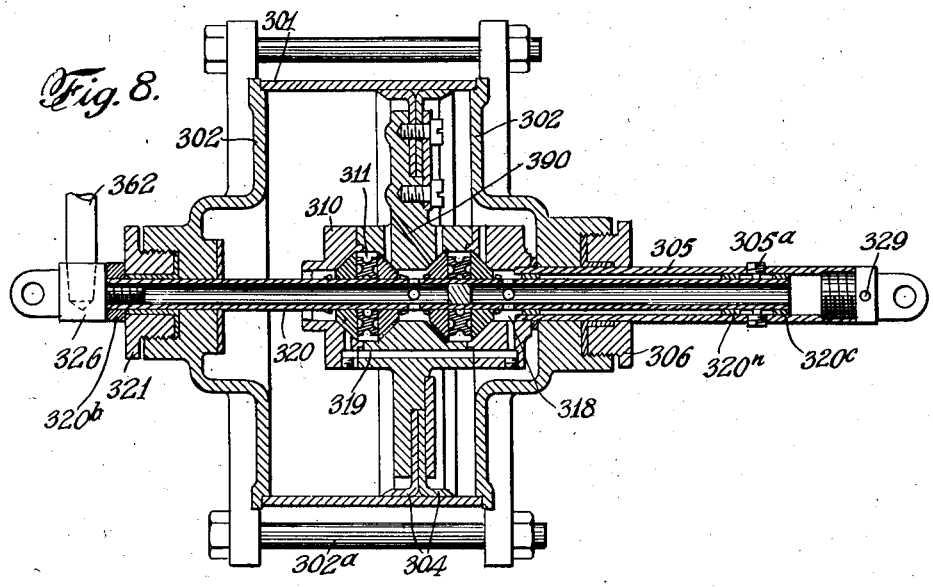
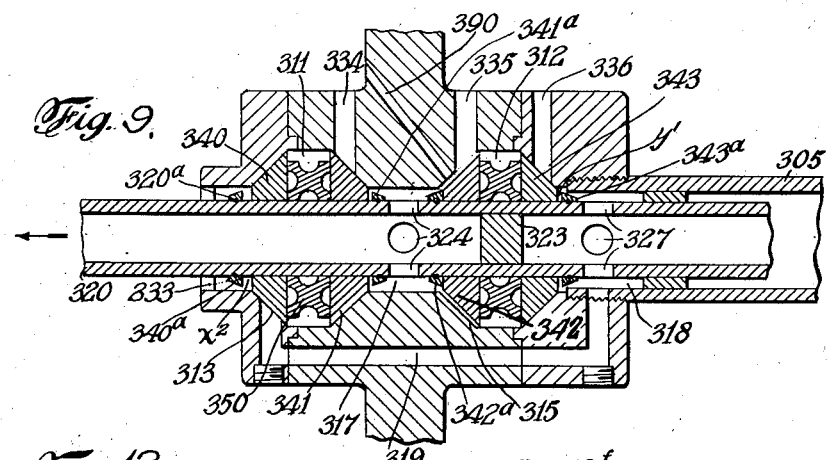
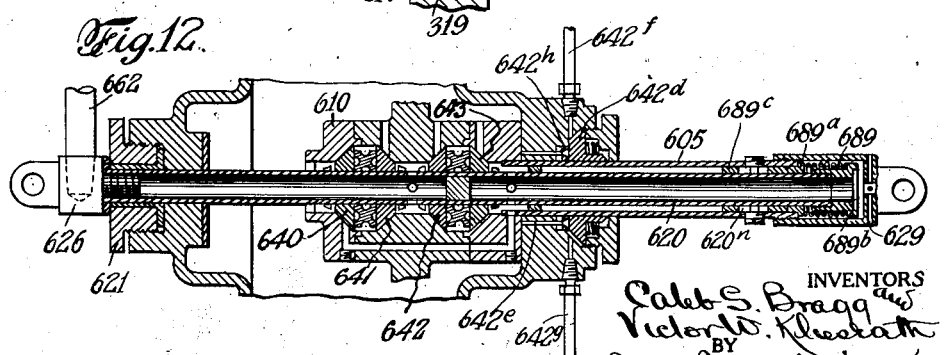

Patented Oct. 11, 1932

1,882,543

UNITED STATES PATENT OFFICE

CALEB S. BRAGG, OF PALM BEACH, FLORIDA, AND VICTOR W. KLIESRATH, OF SOUTH BEND, INDIANA, ASSIGNORS TO BRAGG-KLIESRATH CORPORATION, OF LONG ISLAND CITY, NEW YORK, A CORPORATION OF NEW YORK

POWER ACTUATOR FOR BRAKE MECHANISM FOR AUTOMOTIVE VEHICLES

Application filed March 5, 1925, Serial No. 13,183. Renewed March 4, 1932.

Our invention consists in the novel features hereinafter described, reference being had to the accompanying drawings, which illustrate several embodiments of the same selected by us for purposes of illustration, and the said invention is fully disclosed in the following description and claims.

In our former application for Letters Patent of the United States, filed January 5, 1925, and given Serial No. 506, we have described and illustrated a power actuator operated by suction from the intake manifold of the internal combustion engine forming part of a motor vehicle, for the purpose of actuating the brake mechanism under the control of an operator operated device connected with reversing valve mechanism with which the actuator is provided, the connection between the actuator and the intake manifold of the engine being such that when the parts are in normal or "off" position, and the engine is running, the air is exhausted from the cylinder of the actuator on both sides of the piston, the cylinder thus serving also the purpose of a vacuum storage space and obviating the necessity of using an extraneous vacuum tank to secure operation of the brakes instantaneously. It follows from this construction as set forth in our former application that when the reversing valve mechanism is moved into a position to effect the operation of the actuator, one end of the cylinder, on one side of the piston, is connected with the intake manifold (or other vacuum producing means) the other end of the cylinder on the other side of the piston being connected with a source of higher pressure fluid, as atmospheric air, and the immediate result is that the atmospheric air rushes in to the end of the cylinder to which it is admitted and effects the operation of the piston in the desired direction to apply the brakes and to the desired extent without any appreciable quantity of air being actually withdrawn from the cylinder and admitted to the intake manifold or other suction means, thereby eliminating the drop in suction, or rarification, which would result if the cylinder were full of air, and leaving the maximum suction immediately available.

In the operation of the apparatus described in our former application when the reversing valve mechanism is moved in the opposite direction to relieve the brakes, the connection of the opposite ends of the cylinder respectively with the suction and higher pressure fluid inlet are reversed, the air previously admitted to apply the brakes, is exhausted into the manifold and new quantities of air are admitted on the forward side of the piston which restores the piston to its normal position after which the air admitted in restoring the parts to initial position, is exhausted, leaving a condition of rarification in the cylinder on both sides of the piston, which is maintained at the highest possible rarification by means of a suitable check valve in the vacuum or suction line. In other words, practically no air exhausts into the intake manifold when the brakes are applied, but air must be exhausted from the cylinder on one side of the piston during the retraction of the piston, and on the other side of the piston, after it reaches its "off" position.

It frequently happens, however, that the continued application and partial release of the brake without fully releasing, is necessary, as for example, in descending long grades or in proceeding in traffic on any grade. In such case, the operator's foot may not leave the brake pedal for considerable periods, as only a small amount of movement of the pedal is necessary to relieve or apply the effective braking pressures on the bands or drums of the brake mechanism. Continued operation of the actuator under these conditions, results in atmospheric air being admitted alternately to both sides of the piston, which air must be exhausted during the next application or release of the brakes, as the case may be, the said air somewhat delaying the action of the actuator if the passage to the intake manifold is restricted, or otherwise tending to stall the motor if it is idling, as for example, when the clutch is disengaged.

According to our present invention, we provide for releasing the brakes during the normal action of continued or repeated application of the brakes without admitting air to the cylinder forward of the piston, and thus obviating the necessity of withdrawing such air and delivering it into the intake manifold. Any application of the brake is obviously effected by the pressure of atmospheric air (or other higher pressure fluid) operating on the rear face of the piston, while the forward face is subjected to a partial vacuum. When the brakes are so applied, they are exerting a retracting force on the piston, which would be sufficient to pull the piston rearwardly, were it not for the presence of the atmospheric air, or other higher pressure fluid, acting against the rear face thereof. According to our present invention, therefore, during the operation of continuously applying and releasing the brakes, we exhaust the atmospheric air (or other higher pressure fluid) from the cylinder in rear of the piston, without admitting atmospheric air (or other higher pressure fluid) to the cylinder forward of the piston. It follows that the piston thus being submerged in a substantially equal state of partial vacuum on both sides thereof, the load or retracting force of the applied brake mechanism has only to overcome the negligible frictional resistance of the piston and other working parts, to release itself, or in other words, move the piston back far enough to relieve the brake band pressure from the drums. The next succeeding application of the brakes is effected in the manner hereinbefore described after the piston has been retracted to the at rest, or neutral position, with respect to the reversing valve mechanism, by admitting atmospheric air again to the cylinder in rear of the piston, again applying the brakes without withdrawing any appreciable quantity of air from the cylinder forward of the piston. In the practical application of our invention, we have discovered that the retracting force of the brakes upon the piston when permitted to exert itself in the manner just described, will frequently pull the piston rearwardly with such force as to increase the degree of partial vacuum, or rarification, in the cylinder, on the forward side of the piston beyond the extent of rarification that exists in the suction line leading to the intake manifold, so that when the next succeeding application of the brakes is effected by admitting air, or higher pressure fluid, in rear of the piston, providing the braking load on the piston has not been completely released, the forward side of the piston is for the time being actually subjected to a greater degree of rarification than that existing in the intake manifold, thus insuring the highest efficiency in such application of the brakes. According to our invention, however, when it is desired to release the brakes completely and return the piston to its normal, or "off", position, as when the operator's foot is removed from the brake pedal and the full force of the retracting spring of the brake pedal is effective on the reversing valve mechanism, the air in the rear of the piston is exhausted, and atmospheric air (or other higher pressure fluid) is admitted to the cylinder on the forward side of the piston to positively force the piston back to its normal or "off" position, and completely release the brake mechanism. In other words, by means of our invention, the valve mechanism may be actuated in all instances to apply the brakes without delivering air to the intake manifold, and by a partial reversing movement of the valve actuating mechanism, the air, or other higher pressure fluid, admitted to the rear of the piston, is exhausted to permit the retractive force of the brakes to effect their own release and move the piston rearwardly without admitting air, or higher pressure fluid, forward of the piston, while, the complete reverse movement of the valve actuating mechanism, will both exhaust the air, or other higher pressure fluid, from the cylinder in rear of the piston and admit it to the cylinder forward of the piston to positively restore the piston and brake mechanism to their normal or "off" positions.

In order that our present invention may be clearly understood, we have illustrated some embodiments of the same in the accompanying drawings, in which Fig. 1 is a diagrammatic view representing an installation of our improved power actuator in connection with the internal combustion engine of an automotive vehicle for the operation of the brake mechanism thereof.

Fig. 2 is an enlarged sectional view illustrating one form of our improved actuator having one form of our present invention embodied therein, and showing the valve mechanism and the piston in their normal, or "off" positions.

Fig. 3 is an enlarged view of the piston hub and reversing valve mechanism, showing the positions of the valves to effect the forward movement of the piston for the application of the brake mechanism.

Fig. 4 is a similar view showing the positions of the valve in neutral position, after movement of the piston in either direction to overtake the valve actuating part and permit of the valves to close.

Fig. 5 is a similar view showing the positions of the valves when the valve actuating device is partially released, to permit the brake mechanism to release itself and partially retract the position.

Fig. 6 is a similar view showing the positions of the valves when the valve actuating part is fully reversed to effect the return of the piston and brake mechanism, to normal or "off" position.

Fig. 7 is a partial sectional view of one form of actuator, omitting the auxiliary valve.

Fig. 8 is a view similar to Fig. 2, showing a slightly modified arrangement for maintaining rarification on both sides of the piston, and equalizing pressures on both faces of the piston when the valves are in neutral position.

Fig. 9 is an enlarged view of the mechanism illustrated in Fig. 8, showing the valves in normal position.

Figs. 10 and 11 illustrate a modified form of valve which may be employed on opposite sides of the vacuum chamber, in any of the valve mechanisms herein shown, to effect the rarification within the cylinder on both sides of the piston and equalization of pressures.

Fig. 12 is a partial sectional view illustrating another slight modification of the actuator, in which the retracting spring for the brake pedal operates directly on the valve actuating sleeve.

In Fig. 1 of the accompanying drawings, we have shown diagrammatically an installation suitable for use in an automotive vehicle, in which our improved actuator is shown as interposed in the connection between a foot lever, 88, and brake mechanism, for the vehicle, diagrammatically represented at 70, 71 and 72, indicating a brake drum, brake band and brake lever, but it is to be understood that our invention is applicable to any form of brake mechanism. 60 represents an internal combustion engine for propelling the vehicle, and provided with an intake manifold, indicated at 61, to which is connected a pipe, 62, provided with a check valve, 65, and a vent valve, 67ª, normally closed, and opening outwardly. In some instances we may employ an adjustable restricting valve, or regulating valve, indicated at 64, but for our present invention, this restricting valve may be omitted. The pipe, 62, communicates with our improved power actuator, the cylinder of which is indicated at 1 in Fig. 1, the said pipe having a flexible portion connected to a hollow valve actuating sleeve, 20, and communicating with reversing valve mechanism. The sleeve, 20, is connected by a link, 85, with the foot lever, 88, which is provided with the usual retracting spring, 89, and the piston rod, 5, of the actuator is connected by link, 73, with the brake lever, 72.

In Fig. 2 we have shown one form of our improved actuator embodying our present invention. In this figure, 1, represents the actuator cylinder closed at both ends by heads, 2, connected by bolts, 2ª, and nuts. 3 represents the double acting piston, provided with oppositely disposed gaskets, 4—4. 5 represents the hollow piston rod extending through a stuffing box, 6, in one end of the cylinder. The hub, 10, of the actuator piston is provided with two valve chambers, 11 and 12, respectively, each of which is provided with two valve seats oppositely disposed to each other, preferably conical, and coaxial with the piston. The valve chamber, 11, is shown as provided with valve seats, 13 and 14, and the chamber, 12, is similarly provided with valve seats, 15 and 16. The piston hub is provided in this instance with an outlet chamber or suction chamber, indicated at 17, which can communicate with each of the valve chambers, through the openings in the valve seats, 14 and 15. The piston hub is also provided with a higher pressure chamber, 18, in this instance communicating with the atmosphere, through an aperture, 29, in the hollow piston rod, 5, but which may communicate with any other source of higher pressure fluid at a pressure higher than the degree of rarification maintained in the manifold of the engine, as for example, pressure fluid, i. e. burnt gases under pressure, from one or more cylinders of the engine. The chamber, 18, communicates directly with the aperture in the valve seat, 16, and by a lateral passage, 19, with the aperture in the valve seat, 13, at the opposite end of the piston hub. 20 represents the valve actuating part, consisting in this instance of a valve sleeve passing through a stuffing box in the cylinder head, and extending longitudinally through the piston hub, the chambers thereof, and through the hollow piston rod, 5, and being movable longitudinally with respect thereto, to effect the operation of the reversing valve through which it extends coaxially. The valve sleeve is divided into two parts by central plug, 23, and is provided on one side of said plug with suction apertures, 24, communicating with the suction chamber, 17, and on the other side of said plug with apertures, 27, communicating with the higher pressure chamber, 18, and also with the atmosphere, or other source of higher pressure fluid, admitted through the hollow piston rod, as before stated. The suction chamber, 17, is adapted to be connected with the cylinder on opposite sides of the piston by means of a port, or ports, 34, in the valve seat, 14, and port, or ports, 35, in the valve seat, 15. The valve seat, 13, communicates with the cylinder on one side of the piston through the annular passage, 33, and the valve seat, 16, is provided with a port, or ports, 36, communicating with the cylinder on the opposite side of the piston, thus enabling the higher pressure chamber, 18, to be connected with the cylinder on both sides of the piston.

Each of the valve chambers, 11 and 12, is provided with a pair of oppositely disposed poppet valves, preferably conical, engaging the opposite valve seats, said valve being preferably formed of molded rubber and being loose on the valve actuated sleeve, which passes therethrough, said valve may, however, be formed of other material, if preferred. The valves are indicated at 40, 41, 42 and 43, and are held firmly seated by yielding means, which also provides for sealing the opening in the valve through which the sleeve passes. In the present instance, we have shown a rubber cushioning device, 50, of elastic rubber, interposed between the valves 40 and 41, and between the valves, 42 and 43, said cushioning device being annular in form and fitted tightly on the outer surfaces of the valves, and the valve actuating sleeve, and serving the combined purpose of retracting and seating means, and sealing means, for the adjacent valve. The actuating sleeve is provided with means for opening one valve of each pair when the sleeve is moved in either direction. As herein shown, this function is performed by four collars, $40^a$, $41^a$, $42^a$ and $43^a$, secured to the sleeve in any desired manner, as by spring rings, indicated at $20^a$, in a well known way. The specific details of the poppet valve mechanism, except as hereinafter described, are covered by our former applications for Letters Patent of the United States filed November 22, 1924, Serial No. 751,481 and January 31, 1925, Serial No. 5,947. In the normal position of the valve mechanism when the piston is retracted, as indicated in Fig. 2, and also in Fig. 4, the valve sleeve is arrested (in this instance) by the engagement of the fitting, 26, with the adjustable follower, 21, of the adjacent stuffing box, in such position that all four of these valves are seated and the valve actuating collars for the valves, 41, 42 and 43, are slightly separated from the valves substantially equal distances. The actuator collar, $40^a$, for the valve, 40, however, is separated from the valve, 40, a considerably greater distance, as most clearly shown in Fig. 4, where this space is indicated at X.

The actuator is provided with means for maintaining a partial vacuum within the cylinder on both sides of the piston, when the piston is in retracted or "off" position, and our former application Serial No. 506, filed January 25, 1925, before referred to, illustrates several ways in which this may be accomplished, some of which are shown herein. In the present instance the head of the cylinder, adjacent to which the piston comes to rest in the "off" position, is provided with a passage, or passages, $542^a$, communicating with a recess, $542^b$, in which is located a valve seat, $542^c$, engaged by a movable valve, $542^d$, which, during the application of the brakes, closes communication between the recess, $542^b$, and the interior of the cylinder at both sides of the piston. The valve is operated by a ring, $542^h$, provided with one or more projections, $542^e$, extending into the cylinder far enough to be struck by the piston hub when the piston returns to its normal position, so as to insure the opening of the valve, $542^d$. The valve seat, $542^c$, is connected by a flexible pipe, or tube, $542^f$, with the suction pipe, 62, independent of its action with the reversing valve mechanism through the hollow sleeve, 20, and the valve seat, $542^c$, is also connected by a pipe, $542^g$, with the cylinder of the forward side of the piston. The valve, $542^d$, is provided with a light spring, $542^i$, which assists in seating it when the piston is moved away from the adjacent end of the cylinder. It will be noted that when the piston is in its retracted position, as indicated in Fig. 2, the hub will engage the pins, or projections, $542^e$, and open the valve, $542^d$, thus connecting both ends of the cylinder with the auxiliary suction pipe $542^f$, and exhausting the air from the cylinder on both sides of the piston, the valves being maintained in neutral position when the piston is in the "off" position by the collar, 26, engaging the stop, 21.

We will now describe the operation of the apparatus. Assuming that the engine is running, and that a condition of rarification exists in the cylinder on both sides of the piston, if it is desired to apply the brakes, the operator will depress the pedal (or other operator operated part), thereby shifting the valve sleeve longitudinally in the direction of the arrow in Fig. 2, with the result that the collars, $41^a$ and $43^a$, will open the valves 41 and 43, placing the portion of the cylinder forward of the piston in communication with the suction chamber, 17, and the portion of the cylinder in rear of the piston in communication with the higher pressure chamber, 18, as clearly indicated in Fig. 3. The piston will instantly be moved forward, in the direction of the arrows in Figs. 2 and 3, thereby effecting a pull on the link, 73, and applying the brake mechanism. As a condition of rarification exists in the cylinder, forward of the piston, no appreciable quantity of air will be withdrawn from the cylinder into the manifold of the engine during the application of the brake. As long as the sleeve, 20, is moving forward, the piston will move in the same direction. As soon as the operator ceases to move the pedal, the further movement of the piston will cause it to move with respect to the sleeve, 20, far enough to permit the valves, 41 and 43, to be closed by the cushioning device, 50, to bring the parts of the reversing valve mechanism into the positions illustrated in Fig. 4. If it becomes necessary to continually release and apply the brakes, as in descending a long grade, or in a congested traffic, the operator will slightly release the pedal, 88, and the retracting spring, 89, will effect a reverse movement of the sleeve, 20, in the direction of the arrow in Fig. 5, sufficiently to bring the collar, $42^a$, into operative engagement with the valve, 42, to open the same without opening the valve, 40, as clearly shown in Fig. 5. This connects the suction chamber, 17, with the cylinder in rear of the piston, but does not admit higher pressure fluid to the cylinder forward of the piston, and consequently the small amount of air, or higher pressure fluid, admitted in rear of the piston, will be exhausted, and the retracting force of the brakes continuously exerted on the piston will draw the piston rearwardly, and with respect to the valve sleeve, 20, until the valve, 42, is again seated, thus enabling the brake mechanism to substantially release itself, leaving the cylinder forward of the piston in a state of rarification, which may even be increased above that existing in the manifold by the force of the brake mechanism acting to pull the piston rearwardly. If the operator now again depresses the pedal, 88, the valve sleeve, 20, will be again moved forward into the position indicated in Fig. 3, admitting air, or higher pressure fluid, in rear of the piston, and again applying the brakes, and these operations may be repeated as often as necessary without releasing the brake mechanism to its fullest extent, or returning the piston to its normal, or "off" position. When it is desired to fully release the brakes and return the piston of the actuator to its normal position, as when the operator removes his foot from the pedal, 88, the retracting spring, 89, will shift the valve sleeve, 20, rearwardly, in the direction of the arrow in Fig. 6, to its full extent, thereby opening the valve, 42, more widely than before, to connect the cylinder in rear of the piston with the suction chamber, and opening the valve 40, sufficiently to place the cylinder forward of the piston in communication with the higher pressure chamber, 18, through the annular passage, 33, and the by pass, 19, in the hub of the piston, and admitting the higher pressure fluid to the cylinder forward of the piston, as indicated in Fig. 6. The piston will then return to its normal position fully releasing the brakes, and when the hub of the piston strikes the pins, or projections, 542$^e$, the auxiliary valve, 542$^d$, will be opened, establishing communication between the cylinder on both sides of the piston, with the suction pipe, and exhausting higher pressure fluid admitted during the return movement of the apparatus.

It will be obvious that in the operation of our present invention very much smaller quantities of air, or other higher pressure fluid, will be withdrawn from the actuator and delivered into the intake manifold than would be the case if both the valves, 40 and 42, were simultaneously opened each time the valve actuating sleeve was moved in the reverse direction, and consequently there is not only a higher degree of rarification, there is much less danger of stalling the engine if idling, or interfering with its operation by diluting the explosive charges.

As will be seen, there is a certain amount of lost motion between the valve actuating sleeve, 20, and the piston and piston rod, and we provide means for limiting this lost motion, so that after it is taken up, the physical power of the operator may be directly applied to the piston and parts connected therewith, in the manner set forth in our former application Serial No. 506. In the present instance, the valve actuating sleeve, 20, is provided with a recess portion, 20$^n$, and a collar, 20$^c$, and the piston rod is provided with oppositely disposed set screws, 5$^a$, extending into the recessed portion, 20$^h$, so that when the brakes are applied, the operator may, by further pushing on the foot lever, add his physical force to the force of the actuator, and so that, should the power of the actuator fail for any reason, the operator may move the piston by his physical force to apply the brake mechanism and prevent accident, the said movement of the valve sleeve placing the valves in position to vent the forward end of the cylinder and permit this movement. The vent valve, 67$^a$, will permit this action to take place, even if the engine is not running and the throttle and inlet valves of the motor are closed and will prevent the compression of air, which would have to be expelled from the cylinder under such circumstances.

In the accompanying drawings we have shown our invention applied in an actuator so connected with the intake manifold or other suction device that the piston is submerged in a partial vacuum when in normal or "off" position, that is to say, there is a partial vacuum in the cylinder on both sides of the piston. We wish it to be clearly understood, however, that our present invention is equally applicable to other kinds of double acting piston actuators, regardless of whether a partial vacuum is maintained in the cylinder on both sides of the piston, or not and it is also applicable to double acting piston actuators. For example, in the construction illustrated herein, the auxiliary valve, 542$^d$, and associated parts for the purpose of maintaining a partial vacuum on both sides of the piston may be dispensed with and the cylinder provided at that end with a plain head, as indicated, for example, in our former application for Letters Patent of the United States Serial No. 751,481, filed November 22, 1924, as indicated in Fig. 7, in which the same numerals are employed, with the addition of 100. In this case the only difference of operation will be that when the piston is in retracted position and the reversing valve mechanism is shifted in a direction to apply the brake mechanism, and the cylinder forward of the piston is connected with the suction means, and the cylinder in rear of the piston is connected with the inlet for higher pressure fluid, the suction means will have to exhaust or withdraw the air contained in the cylinder forward of the piston. In the partial reversing movements of the valve mechanism while the piston is in an interjacent position between the limits of its stroke and in the complete reversing movements of the valve mechanism, there would be no difference whatever of operation. A partial reverse movement of the valve actuating sleeve sufficiently to open the valve, 42, without opening the valve, 40, would withdraw the air in rear of the actuator piston without admitting pressure fluid forward of the piston, to permit the brake mechanism to move the piston in a reverse direction, exactly as hereinbefore described. A complete reversing movement of the valve actuating sleeve would effect the opening of both valves, 42 and 40, admitting pressure fluid forward of the piston, and positively returning the piston and brake mechanism to normal or "off" position.

In Figs. 8 and 9 we have illustrated another slight modification of our invention. The corresponding parts in these figures are given the same numerals as in Figs. 2 to 6 inclusive, with the addition of 300, and are in the main precisely as shown in these figures, except in the following respects. In this instance, however, the piston is provided with a by-pass, indicated at 390, connecting the valve seat for the valve, 342, with the opposite side of the piston, and the valve actuating part, 340ª, will be so set as to provide lost motion at the point indicated at X², in the manner previously described. In the off or normal positions, the valve actuating sleeve is stopped by collar 320ᵇ, striking the adjustable nut in the end plate of the cylinder, so that the valve, 342, is kept off its seat, permitting the air to be exhausted on both sides of the piston through passages, 390, and 335, the valve 340 remaining on its seat. When the parts are in normal or "off" position, the space within the cylinder on both sides of the piston, will be connected with the suction chamber, 317, by means of the passage, 335, and the by-pass, 390, in the piston. When the valve actuating sleeve is moved in the direction of the arrow, in Fig. 9, the valve, 342, will first be closed so as to cut off communication between the suction chamber and both sides of the piston, after which the valves, 341, and 343, will be opened to connect the cylinder forward of the piston with the suction chamber, 317, and the cylinder in rear of the piston with the higher pressure chamber, 318, and apply the brakes. When the movement of the valve actuating sleeve stops, and the piston overtakes the valve actuating sleeve, as before described, the valves, 343 and 341, will be closed, shutting off source of power, and to release the brakes the valve, 342, is opened, permitting a simultaneous equalization of pressures between the two ends of the cylinder on opposite sides of the piston, and an exhaustion of the air or other higher pressure fluid admitted to apply the brakes. The operator, by alternately depressing and relieving slightly the brake pedal may effect the closing of the valve, 342, and the opening of the valves, 341 and 343, and vice versa, to secure repeated release and application of the brakes, without opening the valve, 340, so that no pressure fluid is admitted on the forward side of the piston, and consequently no additional air is to be exhausted therefrom beyond that admitted for the purpose of applying the brakes. When it is desired to restore the brakes to their normal positions, the brake pedal is released, and the movement of the valve actuating sleeve in the direction opposite to that indicated by the arrow in Fig. 9, would close or seat the valves 341 and 343, and open the valve, 342, and finally the valve, 340, admitting pressure fluid to the cylinder forward of the piston through the by-pass, 319, and annular passage, 333, to quickly restore the parts to normal position, when the final movement of the piston with respect to the valve sleeve, will close the valve, 340, leaving the valve, 342, open, as indicated in Fig. 9, and permitting an immediate equalization of pressures in the cylinder on opposite sides of the piston, and the rarification within the cylinder on both sides of the piston, as in the constructions previously described.

Instead of mounting the suction valves, 341 and 342, with respect to their actuating collar, so that both of these valves shall be held open, thereby, in normal or neutral positions of the valve mechanism, we may accomplish the same purpose by forming the valves, 341 and 342, of yielding material, as rubber and provide them with corrugated surfaces, as indicated in Figs. 10 and 11, in which one of such valves is indicated at 441, and the corrugations at 441ᵇ. The corrugations will serve the purpose of holding said valves normally unseated, and when the valve sleeve is moved sufficiently in either direction to cause a sufficient pressure against one or the other of said valves in a direction toward its seat, said corrugations will be flattened out and the valves seated. The specific valve mechanisms illustrated in Figs. 2, 8, 9, 10 and 11, by means of which rarification will be produced, within the cylinder on both sides of the piston, are not specifically claimed herein, as the same are illustrated, described and claimed in our former application for Letters Patent of the United States, filed January 5, 1925, and given Serial No. 506.

In Fig. 12 we have shown another slight modification of our invention, in which the retracting spring for the pedal lever and valve actuating sleeve, indicated at 89, in Fig. 2, instead of being applied to the pedal lever, as shown in that figure, is directly applied to the actuating sleeve itself, for the purpose of accomplishing certain advantageous results hereinafter described. A certain amount of force must be exerted by the operator in overcoming the pressure of the retracting spring whenever the valve actuating mechanism is operated in a direction to apply the brake, and this pressure, which may be roughly estimated at about forty pounds pressure required to compress the spring, and which, with the customary reduction of from three to four to one, represents ten to fifteen pounds pressure of the operator's foot, is entirely lost where the retracting spring is interposed between the pedal lever and a part of the chassis. It also requires some additional pressure to operate the valves against their cushioning devices, which may be roughly estimated at fifteen pounds. We, therefore, prefer, in some instances to interpose the retracting spring between the valve actuating part and the piston, so that the pressure or force exerted by the operator in compressing the spring, will be transferred from the spring to the piston, and will tend to move it in a direction to apply the brakes, thus causing any physical power exerted by the operator to assist the action of the pressure fluid in the application of the brakes. We prefer to calibrate this spring, with special reference to the resistance of the brake mechanism, so that the power required to compress the spring, plus that required to overcome the resistance of the cushioning and seating devices of the valve mechanism, shall be slightly greater than the resistance of the brake mechanism. In a power actuator constructed, for example like that shown in Fig. 2, in which the auxiliary valve is held open by the piston when in "off" position, we also obtain a further result, to wit that when the operator applies pressure to the foot pedal, the first effect will be to move the piston slightly in a forward direction, sufficiently to release the auxiliary valve, where one is used (as valve, 542ᵈ in Fig. 2, or 642ᵈ in Fig. 12) before the reversing valve mechanism is actuated, thus preventing any possibility of withdrawing any of the pressure fluid admitted for the application of the brake mechanism, before the piston has moved sufficiently to seat said valve, to the intake manifold. As shown in Fig. 12, for example, we dispense with the spring, 89, shown in Fig. 1, and provide the actuator sleeve with a spring, 689, interposed between a collar, 689ᵃ, secured to the hollow piston rod, 605, and a collar, 689ᵇ, secured to the valve actuating sleeve, 620, the said spring being calibrated, preferably to resist a longitudinal compressive force of approximately 40 pounds. The other parts of the actuator illustrated in Fig. 12, have been given the same reference numerals as Figs. 2 and 3, with the addition of 600, except the parts of and connected with the auxiliary valve, which is here indicated at 642ᵈ, the actuating ring being indicated at 642ʰ, the actuating pins at 642ᵉ, the auxiliary suction pipe being indicated at 642ᶠ, and the pipe which connects the valve recess with the opposite side of the cylinder being indicated at 642ᵍ, it being understood that the other parts of said valve and the valves associated therewith are constructed and operate in precisely the same manner as described with reference to Fig. 2, and need not be more particularly referred to. It will be understood that the piston itself, when in normal position, sustains the draft of the brake mechanism, which exerts a pull on the piston in a direction to restore it to or toward its normal position, of slightly more than forty pounds, or in other words, a little more than the pressure required to compress the retracting spring, 689. In the event that the load of the brakes and their retracting springs is not in excess of the force required to compress the retracting spring, 689, of the actuator, they must be strengthened to exceed it, as otherwise the force of the retracting spring, 689, might tend to keep the piston from coming to rest in the off position. In the construction illustrated in Fig. 2, in which the retracting spring is attached to the pedal lever, when the lever is depressed and the valve actuating sleeve is moved forward (to the left in Fig. 2), the higher pressure valve, 43, will be opened before the piston starts to move, and there is a possibility where the valve is opened slowly, that, as the auxiliary valve is at that moment in open position, some at least of the higher pressure fluid may be withdrawn through the auxiliary suction pipe, thus slightly delaying the application of the brake mechanism. In the construction illustrated in Fig. 12, however, when the pedal is depressed and the valve actuating sleeve is moved forward, the physical power of the operator is directly applied to the retracting spring 689, in a direction toward the piston, and is therefore applied to the piston itself. This pressure applied to said spring, must be sufficient to overcome the resistance of the retracting spring, and also the cushioning and seating device of the valves, or approximately fifty-five pounds, for example, and therefore exceeds the resistance of the brake mechanism and its retracting springs. It therefore follows that when the operator depresses the pedal, the first effect is a slight movement of the piston by the physical force of the operator, sufficient to permit the auxiliary valve, 642ᵈ, to close before the valve, 643, and the valve, 641, are opened. This movement of the piston will start the application of the brakes, which will cause a gradually increasing resistance on the part of the brake mechanism to this movement, and as soon as this resistance of the brake mechanism exceeds the pressure required to compress the retracting spring, 689, the valve mechanism will be actuated in the manner hereinbefore described, admitting pressure fluid in rear of the piston, which is then moved forward to apply the brakes under the combined action of the pressure fluid and the physical force of the operator. By this means none of the air or other higher pressure fluid admitted in rear of the piston, will be diverted to the intake manifold and the application of the brakes will take place under the full power of the piston, to which is added the physical power of the operator through the intermediation of the spring. In other words, the physical force exerted by the operator is not lost, but is applied first to the piston, to move it slightly permitting the auxiliary valve to close, and as soon as the resistance of the brake mechanism exceeds the pressure for which the spring, 689 is calibrated, and that required to open the valves, the spring will yield, permitting the valve, 643, to open while the pressure of the operator's foot continues to assist in the operation of applying the brakes.

The construction illustrated in Fig. 12 is not claimed specifically herein, as it forms the subject matter of a divisional application filed by us August 30th, 1926, and given Serial No. 132,368.

What we claim and desire to secure by Letters Patent is:—

1. In a vacuum brake mechanism for automotive vehicles provided with an internal combustion engine having a throttle controlled suction passage, the combination with a power actuator comprising a cylinder and a piston movable therein, passages for the admission and withdrawal of motive fluid to and from said cylinder connections from the suction passage to certain of said passages in the actuator, a high pressure inlet connected to other of said passages in the actuator, valves for controlling said passages arranged in pairs each pair embodying suction and high pressure valves, means normally acting to hold all of said valves in closed position when the piston is in retracted position, an operating member for said valves, means movable with said member for actuating one valve of each pair when the member is moved in one direction to disconnect the suction from the rear of the piston and admit high pressure thereto and to open the suction connection to the forward side of the piston, and means operating when the member is moved in the reverse direction to successively close the high pressure valve and open the suction valve controlling the passages to the rear of the cylinder.

2. In a vacuum brake mechanism for automotive vehicles provided with an internal combustion engine having a throttle controlled suction passage, the combination with a power actuator comprising a cylinder and a piston movable therein, passages for the admission and withdrawal of motive fluid to and from said cylinder, connections from the suction passage to certain of said passages in the actuator a high pressure inlet connected to other of said passages in the actuator, valves for controlling said passages arranged in pairs each pair embodying suction and high pressure valves, means normally acting to hold all of said valves in closed position when the piston is in retracted position, an operating member for said valves, means movable with said member for actuating one valve of each pair when the member is moved in one direction to disconnect the suction from the rear of the piston and admit high pressure thereto and to open the suction connection to the forward side of the piston, means operating when the member is moved in the reverse direction to successively close the high pressure valve and open the suction valve controlling the passages to the rear of the cylinder, and extraneous means brought into operation upon the retraction of the piston for connecting the piston on opposite sides with the source of suction.

3. In a vacuum balanced power actuator for automotive vehicles having an internal combustion engine for propelling the same, the combination with a power actuator having a cylinder and a piston movable therein, inlet and outlet passages for fluid pressure to and from each side of said piston, means normally acting to close said passages when the piston is in retracted position, means operable when moved in one direction to open one of said outlet passages and one of said inlet passages, and means operable when moved in the reverse direction to open one of said outlet passages and one of said inlet passages in retarding succession.

4. In vacuum brake mechanism for automotive vehicles provided with an internal combustion engine for propelling the same and producing a source of suction the combination with a power actuator operated on differentials of fluid pressure one of which is derived from said source of suction, said actuator comprising a cylinder and a piston movable therein, inlet and outlet passages for fluid pressure to each side of the piston, means normally acting to close said passages when the piston is in retracted position, valves for each of said passages, a valve actuating member, and means carried by said member and operable to open one of said outlet valves and one of said inlet valves when the member is moved in either direction, the valve operating means for opening the inlet valve when the actuating member is moved in one direction being located at a greater distance from the inlet valve than the distance between the corresponding outlet valve and the valve engaging means therefor.

5. In vacuum brake mechanism for automotive vehicles provided with an internal combustion engine for propelling the same and producing a source of suction, the combination with a power actuator operated on differentials of fluid pressure one of which is derived from said source of suction, said actuator comprising a cylinder and a piston movable therein, inlet and outlet passages for fluid pressure to each side of the piston, means normally acting to close said passages when the piston is in retracted position, valves for each of said passages, a valve actuating member, and collars carried by said member and operable to open one of said outlet valves and one of said inlet valves when a member is moved in either direction, the valve operating collar for opening the inlet valve when the actuating member is moved in one direction being located at a greater distance from the inlet valve than the distance between the corresponding outlet valve and its valve engaging collar.

In testimony whereof we affix our signatures.

CALEB S. BRAGG.
VICTOR W. KLIESRATH.